US012356171B2

(12) United States Patent
Zhang et al.

(10) Patent No.: US 12,356,171 B2
(45) Date of Patent: Jul. 8, 2025

(54) SOUNDING DEVICE

(71) Applicant: AAC Microtech (Changzhou) Co., Ltd., Jiangsu (CN)

(72) Inventors: Long Zhang, Changzhou (CN); Xiwen Du, Changzhou (CN); Xianjie Dong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 262 days.

(21) Appl. No.: 18/334,346

(22) Filed: Jun. 13, 2023

(65) Prior Publication Data

US 2024/0114293 A1 Apr. 4, 2024

Related U.S. Application Data

(63) Continuation of application No. PCT/CN2022/127381, filed on Oct. 25, 2022.

(30) Foreign Application Priority Data

Sep. 30, 2022 (CN) ......................... 202222624843.1

(51) Int. Cl.
*H04R 9/06* (2006.01)
*H04R 9/02* (2006.01)
*H04R 9/04* (2006.01)

(52) U.S. Cl.
CPC ............... *H04R 9/06* (2013.01); *H04R 9/025* (2013.01); *H04R 9/043* (2013.01); *H04R 9/046* (2013.01)

(58) Field of Classification Search
CPC .......... H04R 9/06; H04R 9/025; H04R 9/043; H04R 9/046
See application file for complete search history.

(56) References Cited

U.S. PATENT DOCUMENTS

2019/0058933 A1 * 2/2019 Huo ....................... H04R 1/021

FOREIGN PATENT DOCUMENTS

CN 110366079 A * 10/2019 ........... H04R 31/006

OTHER PUBLICATIONS

English machine translation of CN-110366079-A (Han et al.; Sound production device; published Oct. 2019) (Year: 2019).*

* cited by examiner

*Primary Examiner* — Mark Fischer
(74) *Attorney, Agent, or Firm* — Wiersch Law Group

(57) ABSTRACT

The present invention provides a sounding device having a frame, a vibration system, a magnetic circuit system, a front cover, a waterproof sealing ring and a waterproof and breathable spacer. The front cover includes a front cover body, a first through hole and a second through hole running through the front cover body, and a support wall of the front cover body. The waterproof and breathable spacer is fixed to the front cover body and completely covers the second through hole, the second through hole connects the front sound cavity with the back cavity. Compared with the related art, the sounding device of the to present invention is easy to assemble, has good waterproof performance, high reliability, and excellent acoustic performance.

10 Claims, 3 Drawing Sheets

A-A

A-A

SOUNDING DEVICE

TECHNICAL FIELD

The invention relates to the field of electro-acoustic transducers, in particular to a sounding device.

BACKGROUND ART

With the development of the mobile Internet era, the number of smart mobile devices continues to rise. The mobile phone is undoubtedly the most common and portable mobile terminal device among the many mobile devices At present, the functions of mobile phones are extremely diverse, such as high-quality music functions and vibration functions, therefore, the sounding device with a vibration function and sound playing function is widely used in the current smart mobile devices.

The sounding device of the related art includes a frame, a vibration system respectively fixed on the frame and a magnetic circuit system with the magnetic gap. The vibration system includes a diaphragm and a waterproof and breathable spacer. The diaphragm is fixed on the frame and forms an inner cavity together with the frame and the magnetic circuit system. The diaphragm is provided with a through hole running through it, and the through hole is connected with the inner cavity. The waterproof and breathable spacer fits the diaphragm and completely covers the through hole.

However, in the sounding device described in the related art, the waterproof and breathable spacer is attached to the diaphragm, and the waterproof and breathable spacer occupies a certain bonding area. The structure is relatively complicated and difficult to assemble. In addition, the attachment between the waterproof and breathable spacer and the diaphragm reduces the sound performance of the vibration and occupies the internal space of the sounding device, which affects the acoustic effect of the diaphragm.

Therefore, it is necessary to provide a new sounding device to solve the above technical problems.

SUMMARY OF THE INVENTION

The main purpose of the present invention is to provide a sounding device which is easy to assemble, has good waterproof performance, high reliability and excellent acoustic performance.

Accordingly, the present invention provides a sounding device including: a frame; a vibration system having a diaphragm fixed on the frame; a magnetic circuit system for driving the vibration system to vibrate; a front cover arranged on a side of the frame close to the vibration system; a front sound cavity formed by the diaphragm and the front cover; an inner cavity formed by the diaphragm, the frame, and the magnetic circuit system; a waterproof sealing ring; and a waterproof and breathable spacer.

The front cover includes a front cover body covering and fixed on the frame, a first through hole connecting the front sound cavity to an outside, a second through hole penetrating the front cover body, and a support wall extending from the front cover body away from the diaphragm for forming a sound channel connecting with the first through hole. The waterproof sealing ring is annular and fixed on an end of the support wall away from the diaphragm for forming a sealing structure; the sounding device and the external terminal are spaced apart and together form the back cavity. The waterproof and breathable spacer is fixed on the front cover body and completely covers the second through hole, the front sound cavity is connected with the back cavity by the second through hole.

Further, the waterproof and breathable spacer is fixed on a side of the front cover body away from the diaphragm.

Further, the front cover body includes a side wall fixed on the frame and extending along a vibration direction of the diaphragm, and a front cover board bent and extending from the end of the side wall away from the frame; the first through hole penetrates the front cover board, the support wall is formed by bending and extending the front cover board, the second through hole penetrates the side wall and/or the front cover board; the waterproof and breathable spacer is fixed to the side wall and/or the front cover board; the waterproof and breathable spacer is fixed with the front cover body by sticking or integral injection molding.

Further, the diaphragm includes a fixed part fixed on the frame, a suspension extending from a side of the fixed part away from the frame, a vibration part connected to the suspension, and a dome attached to the vibration part; the vibration part is provided with a third through hole completely covered by the dome.

Further, along the vibration direction of the diaphragm, an orthographic projection of the second through hole to the diaphragm intersects with the third through hole.

Further, the waterproof and breathable spacer is a waterproof and breathable membrane.

Further, the sounding device includes a plurality of the second through holes.

Further, an outer surface of the front cover body is recessed to form a containment groove, and the waterproof and breathable spacer is located in the containment groove.

Further, the magnetic circuit system includes a magnetic yoke fixed on the frame away from the diaphragm; the magnetic yoke is spaced from the frame to form the leak hole, and the inner cavity is connected with the back cavity through the leak hole.

DETAILED DESCRIPTION OF EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby are only to explain the invention, not intended to limit the invention.

The present invention provides a sounding device 100. The sounding device 100 is applied to the external terminal.

Figure 1:
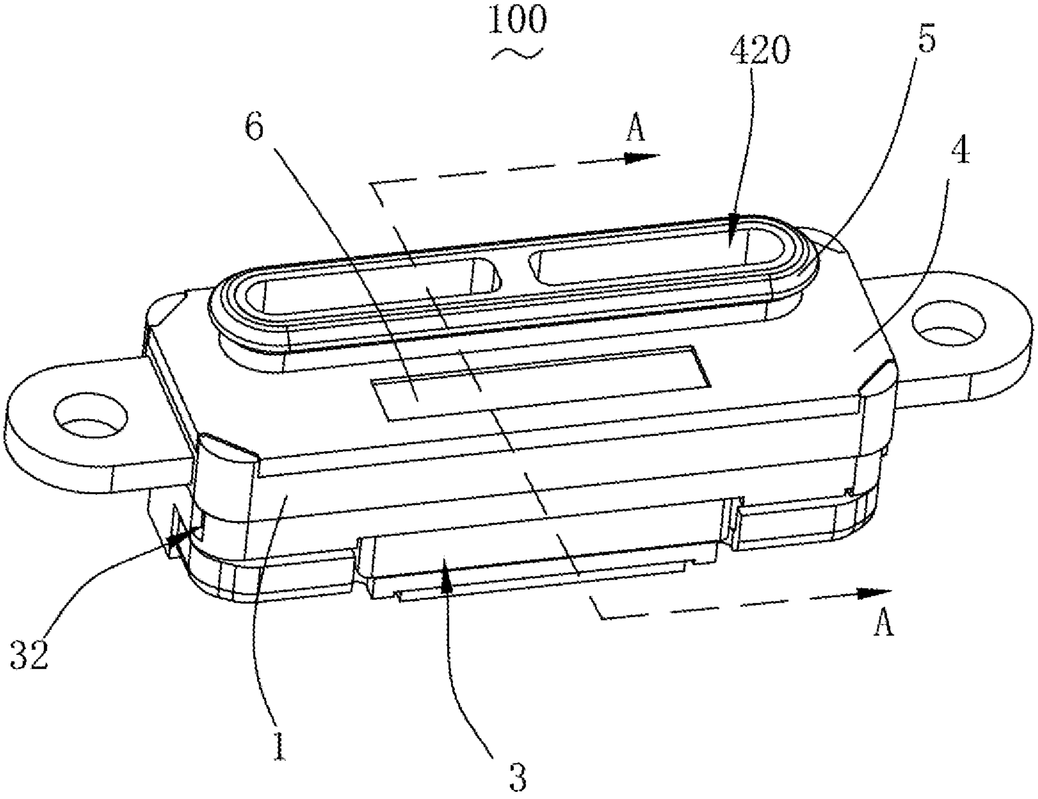
FIG. 1 is an isometric view of a sounding device of an embodiment of the present invention.
Figure 2:
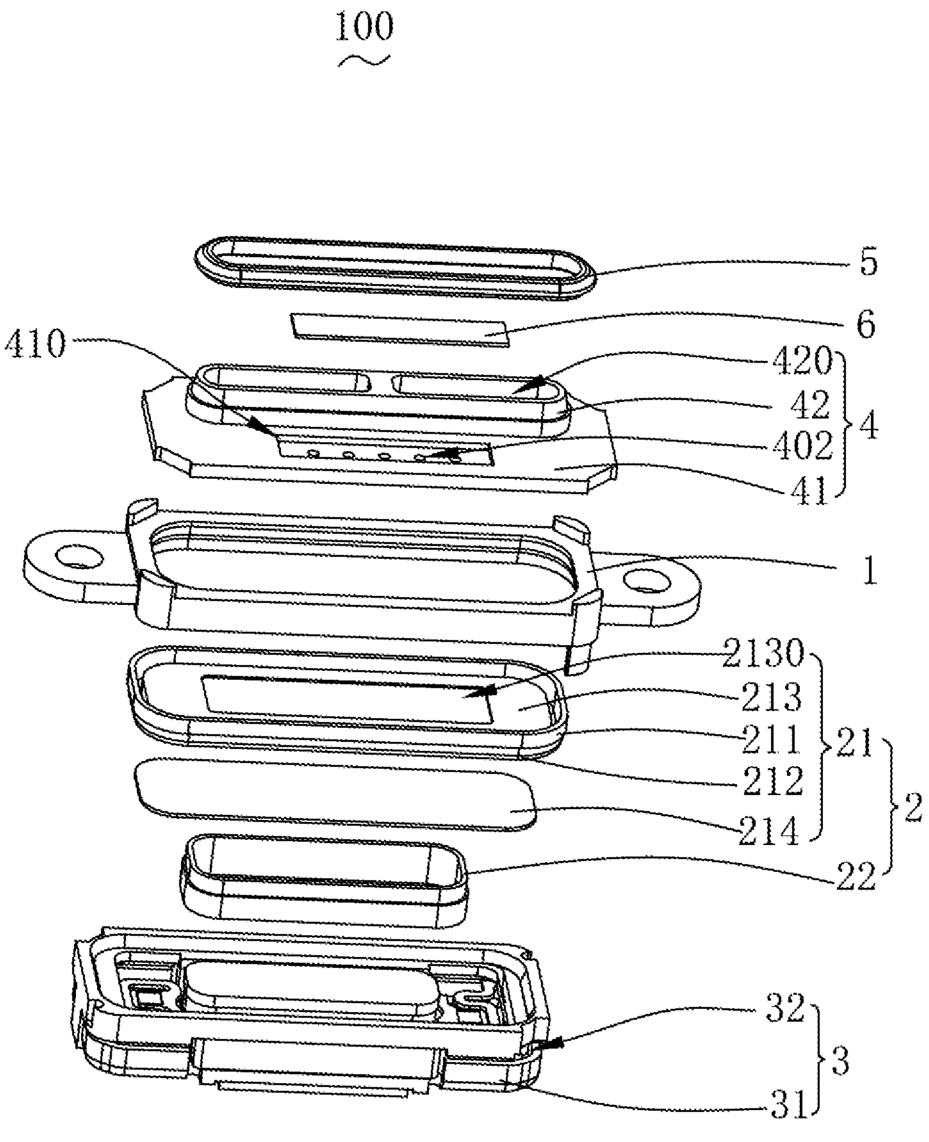
FIG. 2 is an exploded view of the sounding device.
Figure 3:
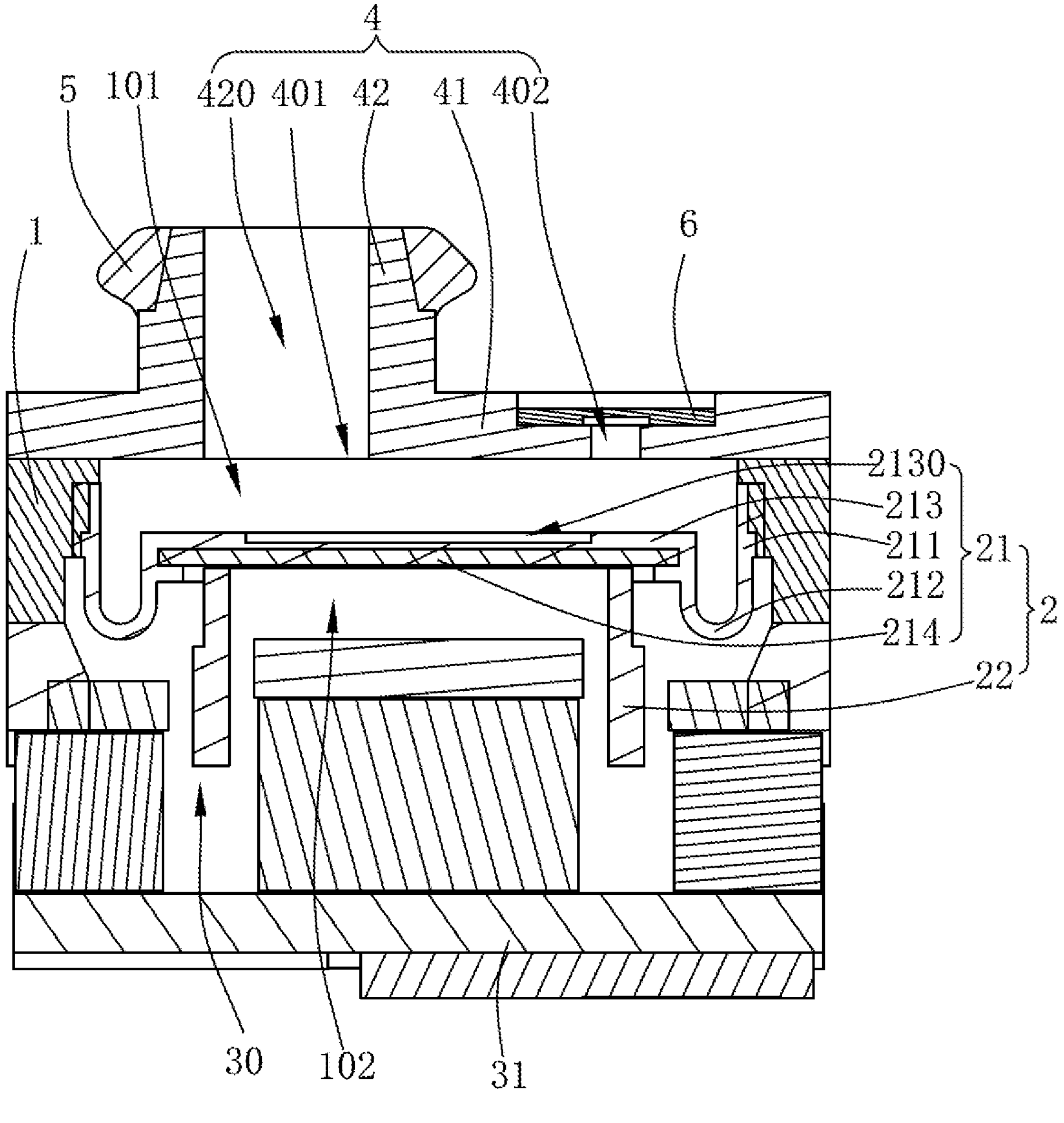
FIG. 3 is a cross-sectional view of the sounding device taken along line A-A in FIG. 1.

Referring to FIGS. 1-3. The sounding device 100 includes a frame 1, a vibration system 2, a magnetic circuit system 3, a front cover 4, a waterproof sealing ring 5 and a waterproof and breathable spacer 6. Wherein, the magnetic circuit system 3 is provided with a magnetic gap 30.

The frame 1 is used to fix the vibration system 2 and the magnetic circuit system 3. In this embodiment, the frame 1 has a rectangular structure. Of course, the structure of the frame 1 is not limited to a rectangle.

The vibration system 2 is fixed on the frame 1. The vibration system 2 is used to vibrate and sound.

The vibration system 2 includes a diaphragm 21 that is fixed to the frame 1 and vibrates, and a voice coil 22 inserted in the magnetic gap 30 to drive the diaphragm 21 to vibrate and sound.

The diaphragm 21 and the front cover 4 are spaced and together enclose a front sound cavity 101. The diaphragm 21, the frame 1 and the magnetic circuit system 3 together enclose an inner cavity 102.

Specifically, the diaphragm 21 includes a fixed part 211 fixed on the frame 1, a suspension 212 that is bent and extended from the side of the fixed part 211 away from the frame 1, a vibration part 213 connected to the suspension 212, and a dome 214 fixed to the vibration part 213. The vibration part 213 is provided with a third through hole 2130 running through it. The dome 214 completely covers the third through hole 2130.

The magnetic circuit system 3 is fixed on the frame 1. The magnetic circuit system 3 drives the vibration system 2 to vibrate and sound. Specifically, the magnetic circuit system 3 is fixed to the magnetic yoke 31 on the side of the frame 1 away from the diaphragm 21.

The front cover 4 is covered on the side of the frame 1 close to the vibration system 2. The front cover 4 includes a front cover body 41, a first through hole 401 and a second through hole 402 penetrating the front cover body 41, and a support wall 42.

The front cover body 41 is covered and fixed on the frame 1.

The front sound cavity 101 is connected with the outside world through the first through hole 401.

The support wall 42 extends from the front cover body 41 in a direction away from the diaphragm 21. The support wall 42 is annular and forms a sound channel 420 and communicates with the first through hole 401.

The waterproof sealing ring 5 is annular. The waterproof sealing ring 5 is sleeved and fixed at the end of the support wall 42 away from the diaphragm 21 for connection with the external terminal to form a sealing structure, in this way, the sounding device 100 and the external terminal are spaced apart and together form a back cavity. Wherein, the front sound cavity 101 is connected with the back cavity through the second through hole 402. The structure of the support wall 42 and the waterproof sealing ring 5 enables the sounding device 100 to have good sealing performance with the external terminal, so that the waterproof performance of the front sound cavity 101 is improved, and the reliability of the sounding device 100 of the present invention is high.

The waterproof and breathable spacer 6 is fixed to the front cover body 41 and completely covers the second through hole 402. In this structure, the waterproof and breathable spacer 6 does not need to be attached to the diaphragm 21, and does not occupy the volume of the front sound cavity 101 and the inner cavity 102, the vibration of the diaphragm 21 is also not affected, and the acoustic performance of the sounding device 100 of the present invention is improved. Meanwhile, the waterproof and breathable spacer 6 is fixed on the front cover 4, the structure is simple and easy to assemble, so that it is difficult for the water vapor in the back cavity to enter the front sound cavity 101, and the waterproof performance and reliability of the sounding device 100 are improved.

In this embodiment, the waterproof and breathable spacer 6 is fixed on the side of the front cover body 41 away from the diaphragm 21. This structure makes the waterproof and breathable spacer 6 connected with the back cavity on the front surface of the sounding device 100, so that the sounding device 100 is widely used.

Of course, it is not limited to this, in another embodiment, the front cover body 41 includes a side wall which is fixed on the frame 1 and extends along the vibration direction of the diaphragm 21, and a front cover board which is bent and extended from one end of the side wall away from the frame 1. The first through hole 401 runs through the front cover board. The support wall 42 is formed by bending and extending the front cover board. The second through hole 402 runs through the side wall. The waterproof and breathable spacer 6 is fixed on the side wall. In this structure, the waterproof and breathable spacer 6 is connected with the back cavity at the side of the sounding device 100, so that the sounding device 100 is widely used.

The waterproof and breathable spacer 6 is the waterproof and breathable membrane.

The waterproof and breathable spacer 6 is fixed to the front cover body 41 by pasting or integral injection molding.

In this embodiment, the outer surface of the front cover body 41 is recessed to form a containment groove 410, and the waterproof and breathable spacer 6 is located in the containment groove 410. This structure facilitates assembly and improves the waterproof performance and reliability of the sounding device 100.

In this embodiment, the orthographic projection of the second through hole 402 to the diaphragm 21 along the vibration direction of the diaphragm 21 intersects with the third through hole 2130. This structure prevents the waterproof and breathable spacer 6 covering the second through hole 402 from affecting the sound of the diaphragm 21, which ensures the air pressure balance between the front sound cavity 101 and the back cavity, and at the same time, the acoustic performance of the sounding device 100 is good.

In this embodiment, the number of the second through hole 402 is multiple. The plurality of the second through holes 402 are matched with the waterproof and breathable spacer 6, which facilitates the air pressure balance between the front sound cavity 101 and the back cavity, and enables the sounding device 100 to have good acoustic performance.

In this embodiment, the magnetic yoke 31 and the frame 1 are spaced apart to form a leak hole 32. The inner cavity 102 is connected with the back cavity through the leak hole 32. In this structure, the inner cavity 102 is a closed space, the heat generated by the vibration system 2 and the magnetic circuit system 3 causes the air pressure to increase, the leak hole 32 is set so that the air pressure in the inner cavity 102 is balanced with the back cavity, the leak hole 32 and the second through hole 402 jointly connect the front sound cavity 101 and the inner cavity 102, therefore, the air pressure of the front sound cavity 101 and the inner cavity 102 is balanced, so that the acoustic performance of the sounding device 100 is good.

Compared with related technologies, the sounding device of the present invention, through the sounding unit, the front cover is provided with the front cover body, the first through hole, the second through hole and the support wall, the diaphragm and the front cover are spaced apart to form the front sound cavity together, the front sound cavity connects with the outside world through the first through hole. The waterproof sealing ring is ring-shaped and is sleeved and fixed on the end of the support wall away from the diaphragm for connecting with the external terminal and forming the sealing structure, the sounding device and the external terminal are spaced apart and together form the back cavity. The structure of the support wall and the waterproof sealing ring enables the sounding device and the external terminal to have good sealing to properties, the waterproof performance of the front sound cavity is improved, and at the same time, the sounding device of the present invention has high reliability. In the sounding device of the present invention, the waterproof and breathable spacer is fixed on the front cover body and completely covers the second through hole, the second through hole connects the front sound cavity with the back cavity. In this structure, the waterproof and breathable spacer does not need to be attached to the diaphragm, the volumes of the front sound cavity and the inner cavity are not occupied, the vibration of the diaphragm is not affected, which improves the acoustic performance of the sounding device of the present invention. At the same time, the waterproof and breathable spacer is fixed on the front cover, which has a simple structure and is easy to assemble. Therefore, it is difficult for the water vapor in the back cavity to enter the front sound cavity, which improves the waterproof performance and reliability of the sounding device.

It is to be understood, however, that even though numerous characteristics and advantages of the present exemplary embodiments have been set forth in the foregoing description, together with details of the structures and functions of the embodiments, the invention is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding device for an external terminal, including:

a frame;

a vibration system having a diaphragm fixed on the frame;

a magnetic circuit system for driving the vibration system to vibrate;

a front cover arranged on a side of the frame close to the vibration system;

a front sound cavity formed by the diaphragm and the front cover;

an inner cavity formed by the diaphragm, the frame, and the magnetic circuit system;

a waterproof sealing ring;

a waterproof and breathable spacer;

wherein the front cover includes a front cover body covering and fixed on the frame, a first through hole connecting the front sound cavity to an outside, a second through hole penetrating the front cover body, and a support wall extending from the front cover body away from the diaphragm for forming a sound channel connecting with the first through hole;

the waterproof sealing ring is annular and fixed on an end of the support wall away from the diaphragm for connecting with the external terminal to form a sealing structure;

the sounding device and the external terminal are spaced apart and together form the back cavity; and the waterproof and breathable spacer is fixed on the front cover body and completely covers the second through hole, the front sound cavity is connected with the back cavity by the second through hole.

2. The sounding device as described in claim 1, wherein, the waterproof and breathable spacer is fixed on a side of the front cover body away from the diaphragm.

3. The sounding device as described in claim 1, wherein, the front cover body includes a side wall fixed on the frame and extending along a vibration direction of the diaphragm, and a front cover board bent and extending from the end of the side wall away from the frame; the first through hole penetrates the front cover board, the support wall is formed by bending and extending the front cover board, the second through hole penetrates the side wall and/or the front cover board; the waterproof and breathable spacer is fixed to the side wall and/or the front cover board.

4. The sounding device as described in claim 1, wherein, the waterproof and breathable spacer is fixed with the front cover body by sticking or integral injection molding.

5. The sounding device as described in claim 2, wherein, the diaphragm includes a fixed part fixed on the frame, a suspension extending from a side of the fixed part away from the frame, a vibration part connected to the suspension, and a dome attached to the vibration part; the vibration part is provided with a third through hole completely covered by the dome.

6. The sounding device as described in claim 5, wherein, along the vibration direction of the diaphragm, an orthographic projection of the second through hole to the diaphragm intersects with the third through hole.

7. The sounding device as described in claim 1, wherein, the waterproof and breathable spacer is a waterproof and breathable membrane.

8. The sounding device as described in claim 1 including a plurality of the second through holes.

9. The sounding device as described in claim 1, wherein, an outer surface of the front cover body is recessed to form a containment groove, and the waterproof and breathable spacer is located in the containment groove.

10. The sounding device as described in claim 1, wherein, the magnetic circuit system includes a magnetic yoke fixed on the frame away from the diaphragm; the magnetic yoke is spaced from the frame to form the leak hole, and the inner cavity is connected with the back cavity through the leak hole.

* * * * *